(12) United States Patent
Del Pozo Abejon

(10) Patent No.: US 7,086,124 B2
(45) Date of Patent: Aug. 8, 2006

(54) SYSTEM FOR ATTACHING ACCESSORIES TO A VEHICLE'S BODYWORK USING CLIPS

(75) Inventor: Ruben Del Pozo Abejon, Valdeande (ES)

(73) Assignee: Grupo Antolin-Ingenieria, S.A. (ES)

( * ) Notice: Subject to any disclaimer, the term of this patent is extended or adjusted under 35 U.S.C. 154(b) by 0 days.

(21) Appl. No.: 10/726,825

(22) Filed: Dec. 2, 2003

(65) Prior Publication Data

US 2004/0124650 A1 Jul. 1, 2004

(30) Foreign Application Priority Data

Dec. 3, 2002 (EP) .................................. 02380248

(51) Int. Cl.
*B60R 11/00* (2006.01)
(52) U.S. Cl. ....................................................... 24/295
(58) Field of Classification Search ............... 24/290, 24/291, 293–295; 411/112, 182, 173–175, 411/508; 248/222.11, 289.11, 224.8, 291.1, 248/231.9; 296/39.1, 97.9–97.13, 1.02, 214, 296/71, 146.7
See application file for complete search history.

(56) References Cited

U.S. PATENT DOCUMENTS

| 2,238,238 | A | * | 4/1941 | Westrope ..................... 24/293 |
| 3,426,817 | A | * | 2/1969 | Parkin et al. ................ 411/173 |
| 5,061,005 | A | * | 10/1991 | Van Order et al. ......... 296/97.9 |
| 6,015,126 | A | * | 1/2000 | Murdock ............... 248/289.11 |
| 6,629,809 | B1 | * | 10/2003 | Vassiliou ..................... 411/173 |
| 6,773,051 | B1 | * | 8/2004 | Davey et al. ............... 296/97.7 |
| 2002/0100146 | A1 | * | 8/2002 | Ko .............................. 24/295 |
| 2002/0175529 | A1 | * | 11/2002 | Kwon ........................ 296/1.1 |

FOREIGN PATENT DOCUMENTS

EP 1186787 A1 * 3/2002

* cited by examiner

*Primary Examiner*—James R. Brittain
(74) *Attorney, Agent, or Firm*—Ostrolenk, Faber, Gerb & Soffen, LLP

(57) ABSTRACT

For attaching an accessory to the body of vehicle, a clip is fitted with elastically deformable arms which are inserted by pressure and are secured in a mounting opening in the bodywork sheet. Each clip has a central base and at least six arms. The arms have end formations which rest in opposing senses against the opposite surfaces of the bodywork sheet around the mounting opening. Half of the arms rest on the exterior surface of the sheet and the other half of the arms rest on the interior surface of the sheet.

4 Claims, 4 Drawing Sheets

SYSTEM FOR ATTACHING ACCESSORIES TO A VEHICLE'S BODYWORK USING CLIPS

BACKGROUND OF THE INVENTION

The present invention relates to a system for attaching accessories to a vehicle's bodywork, and more specifically, to an attachment system using clips.

The invention is especially applicable to the attachment of accessories which are located in the interior of the motor vehicle, on the modular roof of the vehicle. For instance, the invention is applicable to the attachment of sunshades, hooks, hangers, handles, spectacle holders, etc.

Systems for attaching accessories to a vehicle's bodywork by means of clips are known, that include elastically deformable arms which are inserted by applying pressure through openings made in the sheet of the vehicle's roof or bodywork, where they remain attached, keeping the accessory in question in place. These clips can be metallic, obtained, for instance, from sheet steel.

For this purpose, clips are known which provide two supports on the bodywork sheet, thereby providing good resistance to stresses applied in the same plane, but are deficient to stresses applied in directions outside of said plane. This circumstance renders this type of clip inadequate for attaching accessories that must withstand stresses in different directions applied in different planes, as is the case of sunshades, handles, etc.

Also known are clips of larger dimensions which provide three main supports. These clips are designed so that one of them alone will withstand stresses in different directions, such as stresses that a sunshade must withstand. However, they have two main limitations: on one hand, their designs allow little flexibility, as they force the accessory axis to pass inevitably through the interior of the metallic clip. On the other hand, they are designs for clips with three large supports on the bodywork, which are inadequate for the attachment of accessories to bodywork sheet of low thickness, since in the working positions, at times, almost the entire couple of force of the accessory bears on one of the supports, deforming the bodywork precisely because of the low thickness of the sheet. In this sense, it must be taken into account that an increasing demand for low thickness of bodywork sheet exists, due to savings in weight and cost, with the aforementioned problems being present particularly in the attachment of sunshades.

SUMMARY OF THE INVENTION

The object of the present invention is an accessory attachment system which avoids the aforementioned drawbacks using clips that tolerate stresses and couples of forces in a manner which is almost non-directional, that is, similar for any direction of applied force in the different working positions of the accessory. This circumstance is especially relevant for sunshades of modular roofs.

The clip used in the accessory attachment system of the invention furthermore presents the following advantages. It maximizes the resistance to stresses and couples of forces exerted on the accessories. This is achieved by maximizing the number of support positions or points between the clip, the bodywork and the accessory, as well as the surface area of such supports. This need is achieved for roof accessories of any size and, moreover, is valid for all existing bodywork sheet thickness.

Minimization of the effort of clipping to the bodywork, especially when the bodywork openings are curved in shape, which is necessary for quasi non-directional attachment systems with multiple supports.

The attachment system of the invention is compatible with small-sized accessories and with different shapes of the supports of the accessories to the bodywork. The system is applicable for any existing accessory size, with the stress and the couple of forces requirements.

The attachment system of the invention allows the relative position between the accessories and the roof lining to be maintained during the manipulation of the modular roof until it is mounted to bodywork.

During mounting, the system of the invention ensures the guidance of the clip to the accessory and of the modular roof to the vehicle's bodywork.

These and other advantages are achieved with the attachment system of the invention through the use of a clip with at least six supports and which is comprised of a central base from which at least six elastically deformable arms extend radially. All of the arms are symmetrically positioned and are bent toward the same side, down with respect to the plane of the central base. The clip is preferably metallic, made of sheet steel.

The clip's base has an opening in which a screw is threaded, to secure the accessory to the clip.

The arms have end formations which lean in opposing senses against the inner and outer surfaces of the bodywork sheet, around the mounting opening. The arms are positioned facing each other in pairs due to the symmetry of the clip. Three of these arms, hereinafter referred to as "wings," lean on the outer surface of the sheet of the bodywork sheet, while the other three, hereinafter referred to as the "pillars," rest on the inner surface. That is, half of the arms lean on the bodywork sheet in one sense and the other half in the opposite sense. The two types of arm occupy mutually alternate positions around the base.

In this way, a large number of supports are provided by the clip of the invention, which act in opposite senses on the bodywork sheet, in alternate positions, thus allowing stresses and couples of forces, which are applied to the accessory from any direction and in any situation or working position of the same, to be withstood.

The clips with six supports which form part of the invention are screwed to the accessory without need for a nut or other additional pieces, for which purpose the perimeter of the opening of the clip's base has a somewhat truncated-cone shape, adapted to the thread of the screw.

The clip's central base is shaped in the form of a plate from whose perimeter the aforementioned arms project. Each two consecutive arms are separated by an intermediate incut whose outline comprises two curved end sections and one intermediate section at a tangent to the end sections, and all of them are placed in the same plane. This provides complete independence between consecutive arms, which is useful in obtaining flexing of the arms during their clipping into the drilled opening in the bodywork, without resistance from the upper area of the arms at their base, in order to achieve a low-effort clipping.

The end formations of the wings, which rest on the exterior surface of the bodywork sheet, comprise a series of transverse folds, which define a transverse channel opened outwards. When assembling the clip in the bodywork sheet opening, that channel will grip the edge of the sheet, with the upper side of the channel resting on the exterior surface of the sheet, while the bottom of the channel rests against the rim of the bodywork opening. The lower side of the channel passes in front of the sheet inclined downwards. The folds made in these wings allow the sheet to be gripped from the edge of the drilled openings, so that all the wings having these folds withstand all the stresses and couples of forces applied from any direction on the accessory, which was attached using the clip. In this way, even when the stresses and couples deflect the clip from the perpendicular to the bodywork plane, some of the wings will withstand the stresses and couples in the upper side of the channel, while others are withstood by the lower side, thus avoiding any advance in the unbalance of the attachment system with the clips.

Moreover, an optimum orientation of the clip with respect to the accessory which is mounted on the vehicle is achieved, with the result that in its position in the vehicle, two of the mentioned wings will always be placed symmetrically with respect to the line of the stresses that the accessory mounted on the vehicle withstands, on the side of the tensile loads.

The aforementioned wings also have sides made up of inwardly rounded longitudinal bands, which facilitates clipping onto circular drilled openings, without touching any sharp edges.

As regards the end formations of the pillars, i.e. the arms which rest on the interior surface of the bodywork sheet, the surface which is oriented towards the interior of the vehicle comprises in a first transverse elbow oriented outwards, approximately at a right angle, which defines an outer segment and that segment, near its free side, has a second transverse elbow directed towards the plane of the base with an angle greater than 90°, which delimits an inclined segment intended to rest on the inner surface of the sheet of the bodywork. This allows an additional three supports on the bodywork to be obtained, so that, along with the aforementioned wings, a clip having six supports is obtained. The end segment of the outer section allows the placing of an anti-rocking support system between the clip and the bodywork, without any need for additional connecting parts, while it allows couples of force applied on the accessories to be withstood. Furthermore, the outer segment allows the lining of the roof to remain fastened, as it is compressed between the section and the accessory.

These accessories have surfaces on which the part of the external section of the pillars, limited between the two aforementioned transverse elbows, externally lean. Such surfaces are limited by projections between which the part of the outer section is located.

All the characteristics and benefits described, as well as other characteristics of the invention, will be better understood with the following description, made with reference to the accompanying drawings, in which an example of embodiment is shown by means of a non-limiting example.

DESCRIPTION OF THE PREFERRED EMBODIMENT

Figure 1:
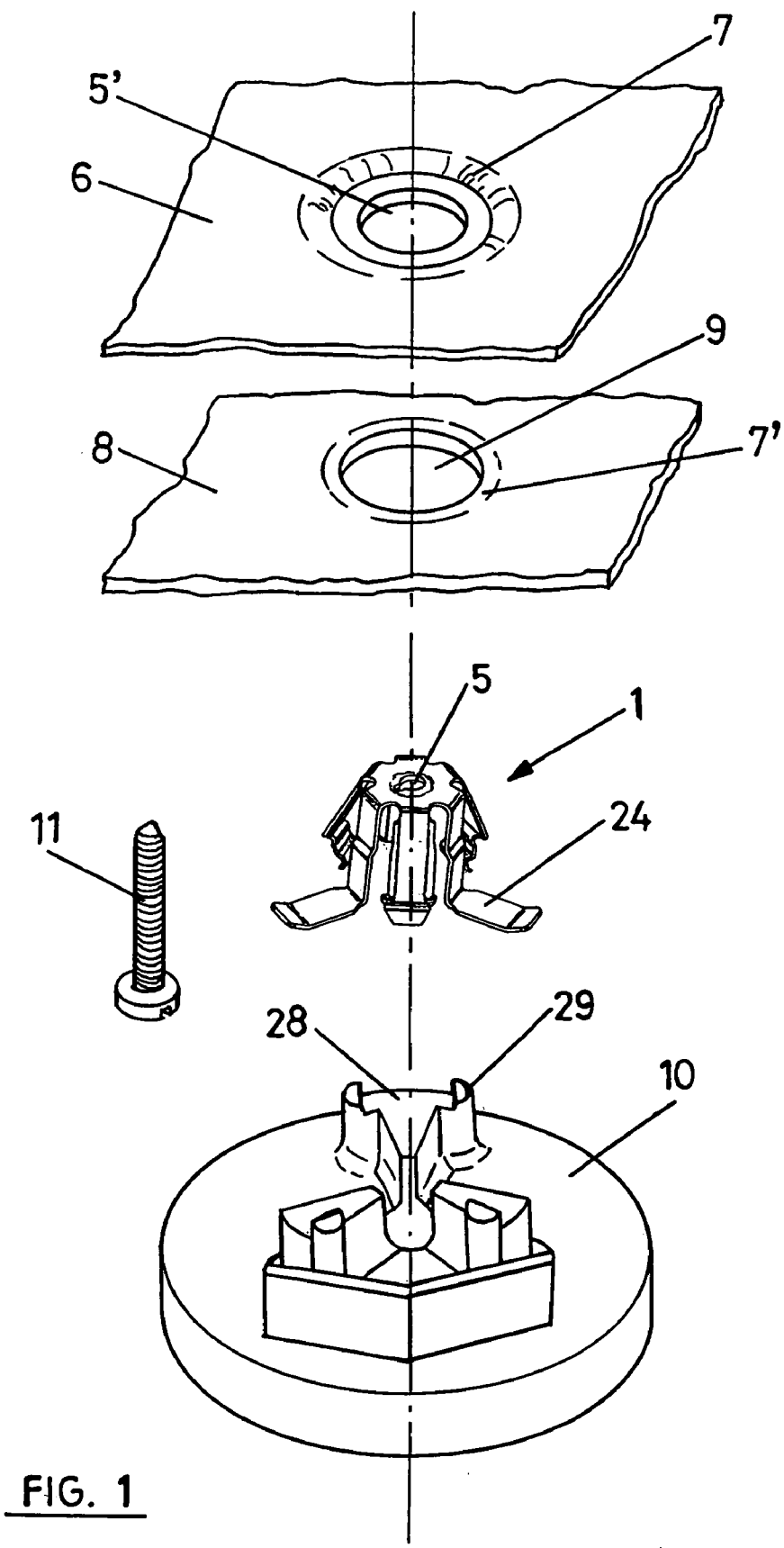
FIG. 1 is an expanded perspective view of an accessory attached to a vehicle's bodywork according to the system of the invention.

In FIG. 1, an expanded perspective view of the mounting of an accessory on the bodywork or modular roof of a vehicle is shown, according to the system of the invention. This attachment is carried out by clips which are generally referenced by the number 1, which, as is best appreciated in FIG. 2, have six arms, three arms 2 identical to each other, called wings; and another three arms called pillars, that are also identical to each other, but different from the wings 2. Both types of arms extend radially from a base 4 that has an opening 5, and the arms occupy symmetrical positions with respect to each other. The wings 2 alternate with the pillars 3. The wings and the pillars are bent toward the same side with respect to the plane of the base 4.

The clip 1 shown in FIG. 1 is intended to be inserted by the use of pressure through the openings 5' made in the bodywork 6 or roof of the vehicle. Preferably, a press-formed structure 7 is formed toward the interior of the cabin, in the area surrounding the openings 5', in order to achieve a flat and reinforced surround of the sheet. A lining 8 is placed over the inner surface of the bodywork 6 or roof. It also has an opening 9 and a shaped formation 7' that fits with the shaped formation 7 of the bodywork.

The introduction of clip 1 through the opening 5' is achieved by an elastic deformation of the wings 2 and the pillars 3. The purpose of the drilled opening 5 of the clip 1 is to receive an inserted screw 11 which holds the accessory 10 intended to be attached to the roof. Preferably, the opening 5 is surrounded by an approximately truncated-cone surface, so that the perimeter of the opening 5 forms a spiral in space, the shape of this spiral being determined by the thread of the screw 11. This allows the attachment of the accessory to be carried out without further use of screws or other additional parts, thanks to the drilled opening 5 and the shaping of its perimeter.

Figure 2:
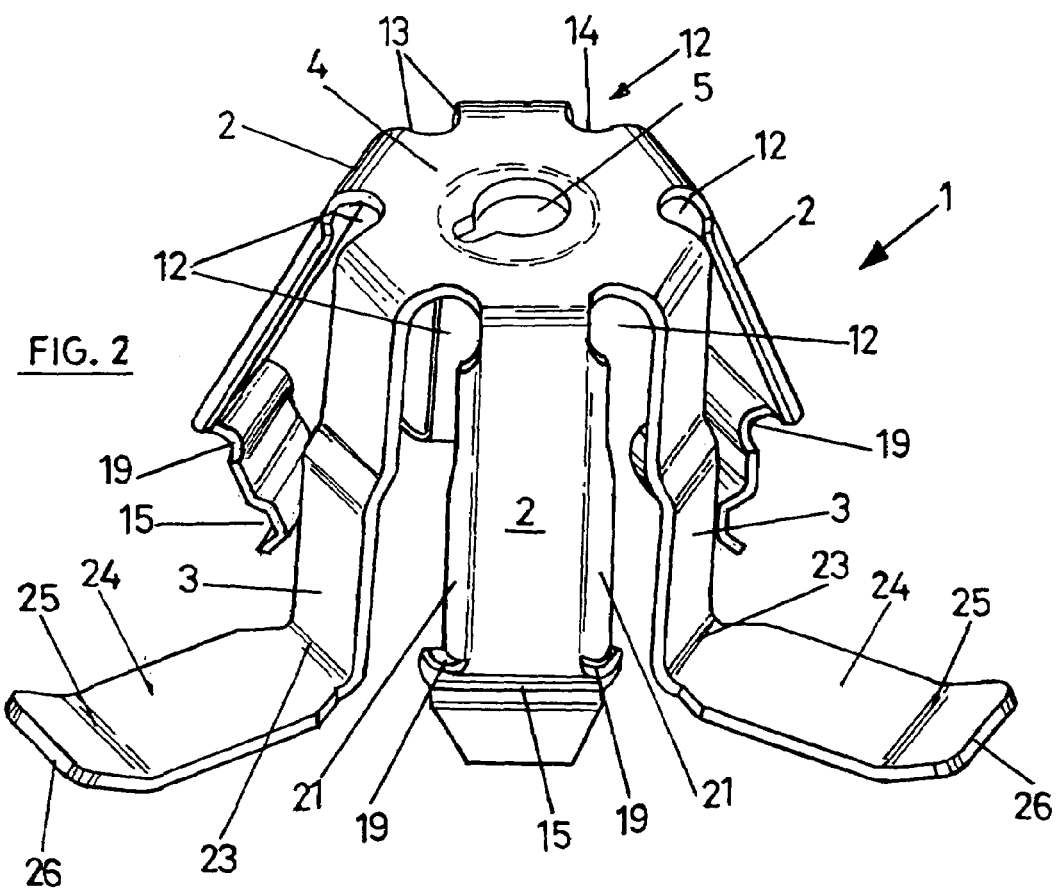
FIG. 2 is a perspective view of the clip used in the attachment system of FIG. 1.

As can be better seen in FIG. 2, the base 4 of the clip 1 is formed in the shape of a plate, with an approximately hexagonal outline that is extended from each of the sides into the wings 2 and the pillars 3. Each consecutive wing 2 and pillar 3 remain separated by an incut 12, whose outline comprises two curved end sections 13 and an intermediate segment 14 at a tangent to the previous ones, all of which are placed in the same plane. The incuts 12 cause a narrowing at the base of the wings and pillars. With this construction, independence between wings 2 and arms 3 is achieved. That facilitates flexing of the wings 2 during their clipping into the opening 5' of the bodywork, without resistance in the upper area of the wings in the incuts 12, thus achieving clipping with little effort.

Figure 3:
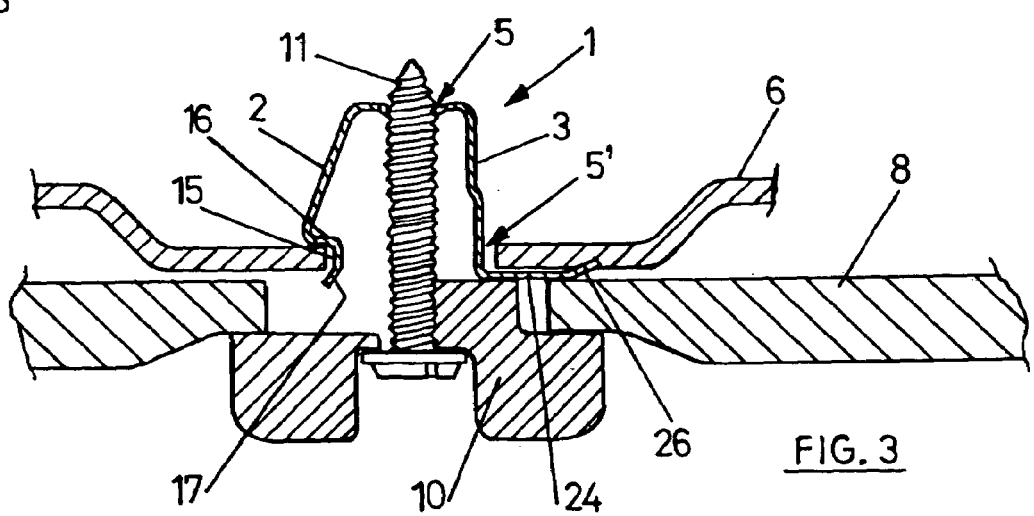
FIG. 3 is a schematic diametrical section of the accessory of FIG. 1 mounted on the vehicle's bodywork.

As shown in FIG. 2, the wings 2 have shaped ends 15 that, as is best seen in FIG. 3, form a channel which will grip the edge or rim of the bodywork sheet when assembling the clip 1 into the opening 5' in the sheet. The upper side 16 of the channel will lean on the exterior surface of the sheet 6, while the lower side of this channel 17 passes along the interior of the sheet 6, inclined downwards. In turn, the bottom of the channel will rest against the edge of the border of the opening 5'. With this structure, the wings 2 withstand stress simultaneously for any type of load applied to the accessory 10. In this way, even when the accessory suffers significant stresses and/or couples of force and the clips 1 tilt with respect to the perpendicular towards the bodywork, wings 2 will withstand the loads on the upper side 16 of the channel, while others will withstand the loads on the lower side 17, with the three wings mutually assisting in all situations.

The lower side 17 of the channel 15 furthermore serves to facilitate the disassembly of these clips with tweezers when they have been mounted in the bodywork.

As shown in FIG. 3, the wings 2 have a pronounced outwards inclination, while the pillars 3 run almost parallel to the screw 11. The main stresses and torques in the area of the folds or channel 15 against the sheet of the bodywork 6, in the surrounding of the drilled openings 5', are withstood by the wings 2. Furthermore, as shown in FIG. 2, they have opposing incuts 19, into their side edges, adjacent to the channel 15, which, along with the incuts 12 adjacent to the base, cause corresponding narrowings, between which said wings have longitudinal strips 21 which are curved inward, defining a rounded outer contour, which facilitates the insertion of the clip in the opening 5' of the bodywork sheet.

In turn, the pillars 3 also have an end formation comprising a first transverse elbow, approximately at a right angle, directed outward, which determines an outer section 24 which has a second elbow 25 directed toward the plane of the base 4, with an angle greater than 90°, from which a segment 26 remains inclined upwards.

When assembling the clip in the drilled opening 5' of the bodywork sheet, the section 24 of these pillars is placed in front of the bodywork sheet 6, on which it rests by the end segment 26, all of which as shown in FIG. 3.

In this way, a clip with six supports is obtained, three of which, defined by the wings 2, rest on the exterior surface of the sheet 6, while the other three, defined by the pillars 3, do so on the interior surface of the sheet 6.

A high number of supports are obtained which act on the bodywork sheet in complementary senses and directions.

The supports on the interior surface of the sheet, defined by the segments 26 of the pillars 3, provide an anti-rocking mechanism between the clip and the bodywork, withstanding part of the stresses and couples of force applied to the accessory. These end segments, in fact, allow the operativeness of the clips for sheets of different thickness, since they will flex more or less according to the thickness of the sheet.

The mounting of the clip on to the openings 5' of the sheet of the bodywork is guided by the clip's general truncated cone shape, defined by the wings 2, along with the curved longitudinal strips 21 of said arms.

As shown in FIG. 1, the accessories 10 may include on their back surface supports 28 for the section 24 of the pillars 3 which are placed in front of the bodywork sheet 6. These supports 28 can, moreover, include projections 29 between which the section 24 of the pillars 3 can be positioned, preventing their displacement, facilitating the handling of the modular roof and the accessories in the vehicle's lifetime, assuring the relative position between clips and accessories and thus guaranteeing maximum resistance to stresses and couples of force on said accessories.

In addition, as shown in FIG. 3, section 24 of the pillars 3 serves to fasten the lining 8 of the modular roof, which remains compressed between said section 24 and the flat surface of the accessory 10. In this way, the modular roof can be manipulated without the accessory changing its relative position in relation to the lining of the roof, until it is mounted on the bodywork.

Figure 4:
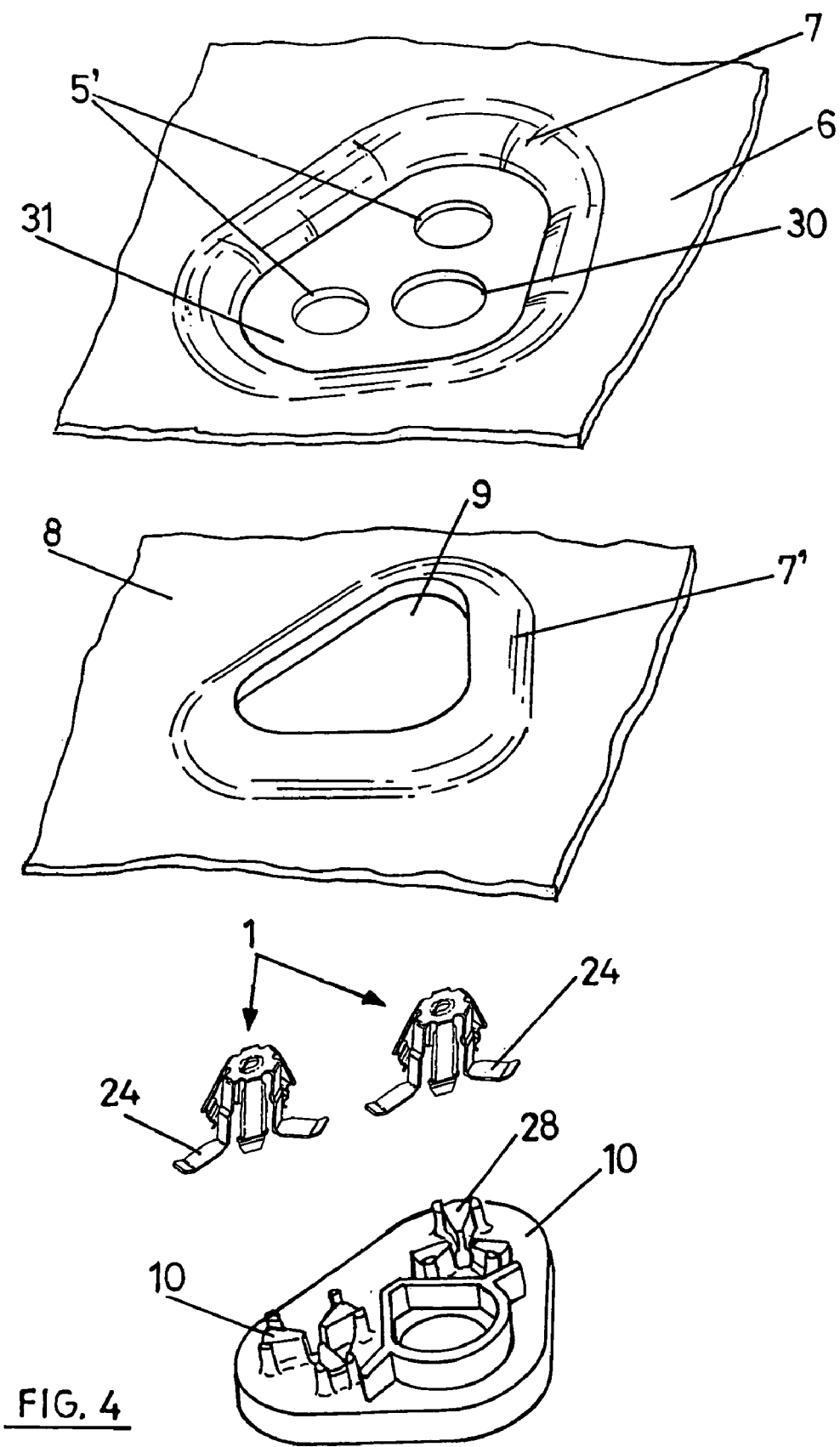
FIG. 4 is a view similar to FIG. 1, in which the accessory consists of the sunshade securing base.

FIG. 4 is a similar view to FIG. 1, in which a specific application of the mounting of a sunshade is shown, using the same references to indicate the same components or elements.

In FIG. 4 the accessory 10 is used for mounting a sunshade and its attachment to the bodywork sheet 6 is achieved by means of two clips 1, for which two openings 5' are formed in the bodywork sheet 6 and a press-formed structure 7 similar to that in FIG. 1 is placed around these openings. The sheet has an auxiliary opening 30 for mounting the sunshade joint.

Figure 5:
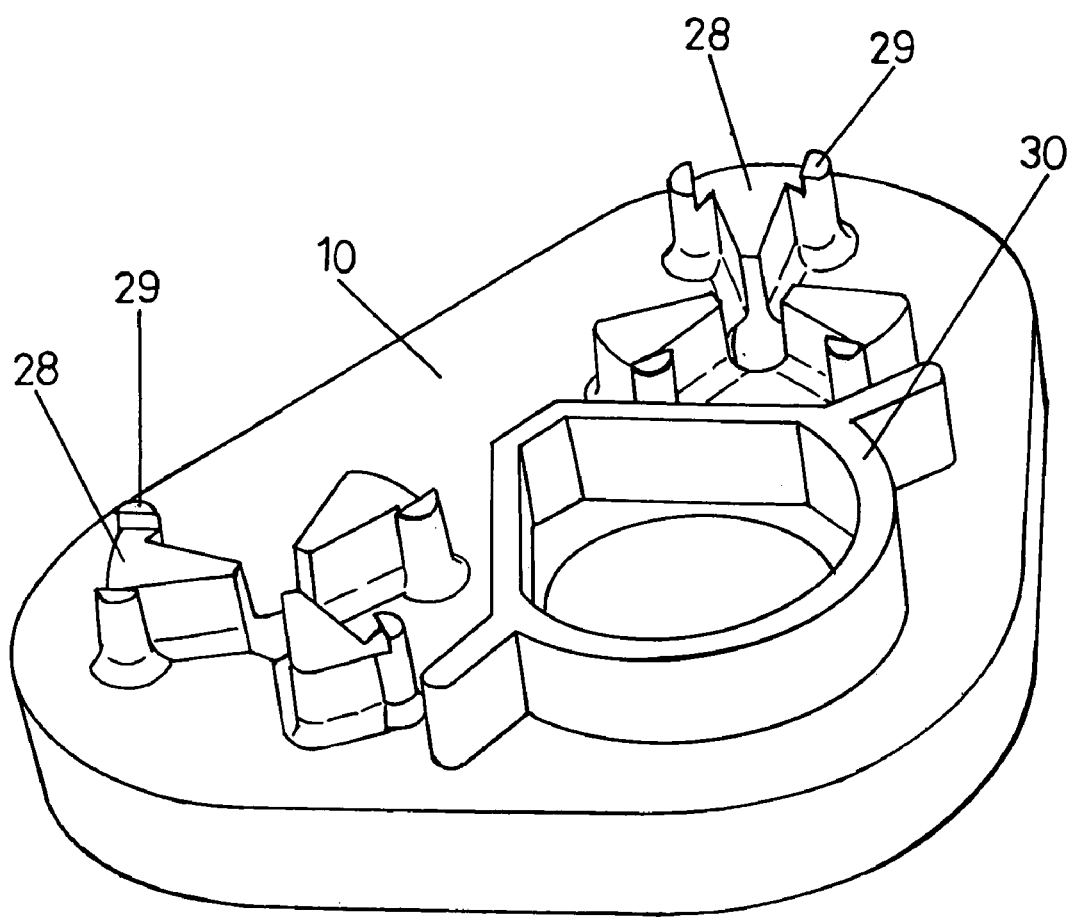
FIG. 5 is a larger scale perspective view of the accessory presented in FIG. 4.

FIG. 5 shows a larger scale perspective view of the accessory 10 which will have two openings for passing of two screws 11 for attachment to the clips 1. Around these openings, the accessory 10 has projections or shaped formations that have surfaces 28 for supporting the section 24 of the pillars 3, along with the lateral projections 29 which ensure the relative positioning between the sections 24 of the clips and the accessories.

Due to the stresses that the sunshade can transmit, in the example of FIGS. 4 and 5, two attachment clips have been used. However, a single clip may be sufficient for the attachment of other accessories.

In the case of FIGS. 4 and 5, the accessories have areas of support 30 against the flat segments 31 of the sheet of the bodywork 6, which assist the clips to withstand stresses and couples applied on the accessories. This allows the bodywork sheet not to have to withstand all the stress in the proximity of the openings 5' when large stresses and couples are applied, thereby preventing their possible deformation and also possible deformations of the clips.

The shaped formations 7 made around the drilled opening or openings 5' will allow the sheet to have a greater resistance in the proximity of the drilled openings.

Optionally, if the requirements of the vehicle so allow, the attachment of the sunshade could be effected by a single clip instead of two, as described with reference to FIGS. 4 and 5.

The clips used in the attachment system of the invention allow a robust system to be obtained for attaching accessories to the lining of the modular roof and of said roof to the bodywork, without requiring any further parts, with exception of the screw 11.

The attachment system can be carried out with an optimized orientation of the clips with respect to the accessories of the modular roof and the assembly of both with respect to the bodywork, in such a way that the resistance to the couples of force and stresses in the working positions of the accessory is greatest. For this, the clip is placed so that two of the wings 2 are symmetrically placed on either side with respect to the line of the stresses withstood by the accessory mounted in the vehicle, on the tensile load side. In the case of the sunshades, as described with reference to FIGS. 4 and 5, this optimized orientation is characterized in that the axis of the sunshade can swivel between the two main positions of the sunshade in the vehicle (front position and side window position). This swiveling is approximately symmetrical and within the angle formed by the lines that connect the center of the central bodywork drilled opening 30, for the sunshade axle, and the centres of the drilled openings 5'.

In the embodiment of FIGS. 4 and 5, the position of the clips 1 which attach the sunshade accessory 10 is characterized in that for each of the two end positions of the sunshade, one of the two clips works with two of the wings 2 on the side of the sunshade body, symmetrically placed with respect to the axis of the couple of force applied to the end of the sunshade. In this way, an attachment system with two arms is achieved that bears the main component of the couple applied to the accessory with the least effort. Furthermore, it has the assistance of the third arm 2 and of the three supports provided by the other three pillars 3, as well as the second clip of the sunshade that also withstands the resulting turning couples.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A system for attaching an accessory to a sheet, wherein the sheet has an attachment opening with a perimeter defining the opening, the system comprising:
   a clip comprising:
      a base for being passed through the opening and for being disposed above one side of the sheet, the base having a perimeter;
      first and second elastically deformable arms, said arms attached to the base and extending back from the base toward the sheet and the opening, the first and second arms alternating in location around the base, and each arm extending radially from the perimeter of the base and being bent from the base back toward the surface and the opening there through, wherein the first and second arms are each arrayed in symmetrical positions around the base;
      a connector between an accessory to be attached to the sheet and the base, for attaching the accessory to the base;
      the first arms having first end formations which lean against a first surface of the sheet that is toward the base of the clip;
      the first end formations comprising a plurality of transverse folds across the respective first arm and shaped to define an outer transverse channel shaped for gripping the perimeter of the opening in the sheet, the first formation being shaped to include an upper side which leans against the first surface of the sheet, a base of the channel which leans against the perimeter of the opening in the sheet and a lower side of the channel to pass the opposite second side of the sheet and which is inclined downwardly; wherein the first arms have a narrowed region adjacent the end formation thereof, said narrowed region produced due to the arms having side edges with opposing incuts defined therein, said first arms also including longitudinal end strips on the side edge of the arms and curved inwardly of the clip toward an axis thereof, located between the incuts of the first arms and the incuts at the base, and further comprising a respective incut in the perimeter of the base between neighbouring arms; and
      the second arms having second end formations which lean against an opposite second surface of the sheet away from the base, the second end formations having an outer segment, the second arms so shaped and the accessory attached to the clip having a surface disposed for being engaged by the outer segment of the end formation of the second arm.

2. The system of claim 1, further comprising projections at the accessory directed toward the clip and shaped for receiving the outer segment of the second arm between two of the projections.

3. The system of claim 2, wherein the sheet and the accessory are attached to a body having an opening there through, with the accessory disposed at one side of the opening in the body and the sheet being at an opposite side of the opening of the body; and an area around the opening of the body being positioned between the accessory and the outer segment of the second arm which rests on the accessory at the opening in the body.

4. The system of claim 2, further comprising an area on the accessory which rests on the sheet and cooperates with the clips to assists the clips to withstand stresses applied to the accessory with respect to the sheet.

* * * * *